United States Patent
Ollivier

(10) Patent No.: US 7,769,616 B2
(45) Date of Patent: Aug. 3, 2010

(54) COMPUTER-IMPLEMENTED METHOD, SYSTEM AND PROGRAM PRODUCT FOR QUOTING A BUSINESS SERVICE

(75) Inventor: Jean Christophe Ollivier, Ozoir-la-Ferriere (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/935,752

(22) Filed: Nov. 6, 2007

(65) Prior Publication Data
US 2008/0147460 A1 Jun. 19, 2008

(30) Foreign Application Priority Data
Dec. 18, 2006 (EP) ................... 06301264

(51) Int. Cl.
*G06F 9/44* (2006.01)
(52) U.S. Cl. .......................................... 705/7
(58) Field of Classification Search ............ 705/7, 705/30; 717/101
See application file for complete search history.

(56) References Cited

U.S. PATENT DOCUMENTS

| | | | |
|---|---|---|---|
| 5,668,995 A * | 9/1997 | Bhat | 718/104 |
| 6,086,618 A * | 7/2000 | Al-Hilali et al. | 703/2 |
| 6,629,081 B1 * | 9/2003 | Cornelius et al. | 705/30 |
| 6,718,535 B1 * | 4/2004 | Underwood | 717/101 |
| 6,978,257 B1 | 12/2005 | Halbout et al. | |
| 7,240,019 B2 * | 7/2007 | Delurgio et al. | 705/10 |
| 2003/0195813 A1 * | 10/2003 | Pallister et al. | 705/26 |
| 2004/0064351 A1 * | 4/2004 | Mikurak | 705/7 |
| 2004/0128263 A1 * | 7/2004 | Dosanjh | 705/400 |

OTHER PUBLICATIONS

Puridiom and Procusoft Offer the First End-to-End Procurement Solution That Delivers Best Value Sourcing Business Wire. New York: May 6, 2006. p. 1.*
Tangram Launches Subsystem to Manage Enterprise Systems Suite Implementations, Unveils Version 2.6 of Asset Insight(R) PR Newswire. New York: Oct. 12, 1998. p. 1.*

* cited by examiner

*Primary Examiner*—Romain Jeanty
*Assistant Examiner*—Luis Santiago
(74) *Attorney, Agent, or Firm*—George R. McGuire; Bond Schoeneck & King, PLLC

(57) ABSTRACT

The present invention provides a method, system and computer program product for quoting a business service wherein a large variety of predefined scenario may be exercised to assess a business quotation in real time. The invention allows to establish relationships between an infrastructure design and the various components of the solution to offer a flexible solution that automatically check the impact of changes and new requirements.

18 Claims, 4 Drawing Sheets

COMPUTER-IMPLEMENTED METHOD, SYSTEM AND PROGRAM PRODUCT FOR QUOTING A BUSINESS SERVICE

PRIORITY CLAIM

The present application claims priority to European Patent Application EP06301264, filed Dec. 18, 2006, the entirety of which is hereby incorporated by reference.

TECHNICAL FIELD

The present invention relates in general to the field of determining the cost of a business offering. More particularly, the present invention relates to a computer-implemented method, system and program product for quoting a business service based on iterative customer requirements.

BACKGROUND OF THE INVENTION

As Information Technology (IT) continues to advance, both business offerings and customers/clients needs continue to grow. In the field of service delivery, it becomes a challenge to provide to a customer a solution in a most effective time to market. The on-demand era implies the need to generate accurate offering quotes whatever the variation of the customer requirements. To address such need, a solution provider has to be sure that the service commitments meet guidelines to facilitate the business quotation.

The client's needs for cost flexibility generate today a strong expectation to purchase facilities to satisfy the on-demand terms and conditions that are initiated by the business. And clients are essentially looking for services where all the resources (Hardware, Software, People, . . . ) are provided and in place on time.

From the service provider perspective, the issues to manage are usually to:

design and deploy a solution that includes flexible and scalable facilities (or service component); and estimate the selling price for these facilities with an associated level of risk.

Managing the cost associated to a service component with a corresponding price unit depends directly on the business context and depending on cost variation, it may generate several complex quotation iterations for the service provider. The usual way to proceed depends on the relationship existing between the cost and the price unit and how they interact.

On one hand, when the variation of the costs element is proportional to the variation of the price unit, the final quotation may be updated quite quickly.

On the other hand, when there is not real coherence between the cost and the price, any variation on one or the other item has an impact on the existing quotation. Different parameters such as investments (in Hardware/Software) and skill resources availability have to deal with the complexity of running numerous iterations to fix the quotation in real time. A current quotation needs then to be recalculated taking into account the various parameters in order to generate an updated price unit and an associated invoice.

For example, let assume that a service provider wants to sell a storage infrastructure composed of backup servers, Storage Area Network (SAN), tape libraries, off-site warehousing for tapes, disk bays, and so as well as selling an end-to-end management. To size the price of the overall solution, a "per Giga Bytes (GB)" price is adopted. However, because individual costs are not each proportional to the volume of GB deployed (e.g. at least one backup server is to be deployed right from the beginning, even for a single GB sold), it becomes difficult to estimate the impact on the price per GB of an architectural change (such as doubling the SAN for example). It is also difficult to anticipate what will be the volume of GB that the customer will really deploy and the pace of that deployment.

Thus, the main challenge resides in defining an "end-to-end" solution, from the architecture design up to the selling price, while being able to measure quickly the impact on cost, profitability, ROI, etc of different architecture or deployment assumptions.

The existing pricing methods consist in:

1. Specifying the assumptions (the non functional requirements, the volumes, the ramp-up or ramp-down, etc);
2. Designing a solution, often based on the target volumes and requirements;
3. Costing the solution, with an estimated deployment pace of the components; and
4. Computing a price by setting price units and computing a revenue (or cost recovery) using the deployment pace assumed; and
5. Generating all the financial (profitability, ROI, payback, etc).

This approach requires that both the deployment of the technical components and the revenue corresponding to the invoiced work units be synchronized together. Then, to simulate and validate additional scenarios (by changing assumptions like the deployment pace, the minimum volume commitments, the work units to invoice, the architecture or the components), it is necessary to restart the entire quotation process by including all the new assumptions plus the collateral modifications such as the skilled resources involved like architects, specialists, finance people, etc. . . .

Moreover, it is a reality that during engagements the client's expectations are changing and evolving very quickly, which implies to align up the infrastructure solution and obviously the associated price at the same rate. This becomes even more complex for the on-demand solutions.

Then, the standard quotation solutions depends on too many manual operations (e.g. entering a volume quantities month by month or quarter by quarter in the architecture models, in the cost models, in the price models). This raises a difficulty to get quickly all the necessary information to be used for the assessment of the quotation, and which is thus a source of errors.

To speed up the assessment process of the standard solution, one way is to use some predefined shortcuts that are available to compute an average cost per work unit. However, it is a rigid approach that is clearly not compliant with the on-demand concept, which aim is to allow both the provider and the client to quickly and safely re-adjust the solution in real-time by minimizing the financial impact for the two parties.

In addition, the existing solutions do not exactly consider the appropriate level of risk associated with the investment peaks and can financially expose the service provider. To mitigate this risk, some improvements to the standard solutions consist in computing an average cost at 50% capacity of the infrastructure. Applying such assumption provides the user with some incoherent results that do not match with the business expectation, do not provide the appropriate level of risk and do not reflect the business reality. Moreover, the standard solution is not adjustable to allow an assessment of the quotation corresponding to different business perspectives.

This is why the architects need to estimate the impact of the changes made to the solution with great care, and in particular, the risk associated with the client's budget and the level of risk taken by the service provider to satisfy the on demand solution requirements.

To summarize, the aforementioned methods present several drawbacks, some of the main ones are:

The standard method is too rigid to be successfully exercised all along an adjustable quotation process when both volume/quantities and price vary.

The standard method depends on too many manual operations that offer room for errors on business quotation.

The standard method is unaware of the business investment peaks and an incorrect level of risk may be generated when the quotation needs to be redone.

The standard method is not flexible to be applied for different business perspectives and provide the adequate quotation.

The standard method is based on a slow moving process that needs to include all the resources involved to generate an updated business quotation.

Then, there is a need for a quotation method that solve the aforementioned problems. The present invention offers such solution.

SUMMARY OF THE INVENTION

The present invention relates to a computer-implemented method, system and computer program product for quoting a business service to be provided to a customer.

In one embodiment, the present invention is implemented in conjunction with a spreadsheet computer program such as IBM's LOTUS 1-2-3, MICROSOFT EXCEL or the like. In this kind of embodiment, the price units and the cost elements can be displayed in rows of respective spreadsheet pages.

The present invention provides a method, system and computer program product for quoting a business service wherein a large variety of predefined scenario may be exercised to assess a business quotation in real time.

The invention allows to establish relationships between an infrastructure design and the various components of the solution. Thereby, a flexible solution is provided to automatically check how a solution globally reacts to changes and new requirements.

The predefined scenario provide guidelines and rules about the relationships between deployable components and price units. Both of them are defined through configuration thresholds that outline a given business configuration and volume capacities.

The present invention allows to improve sales productivity by simulating predefined scenario to easily create and/or re-generate accurate quotations, margin and business profitability.

An object of the invention is to provide a method to generate quickly a business quotation by running several predefined scenario on all or part of the process.

It is another object of the invention to monitor the exact business profitability as well as the level of risk whether during the business assessment or in real time during the business application.

The present invention allows to produce automatically the costs, the revenue invoiced, the profitability and any financial parameters even if the business assumptions are not stable, i.e. the rollout pace, the selected components, the price units, the deployment rules, . . . .

According to one embodiment of the invention, there is provided a computer-implemented method to operate a scalable quotation apparatus all along a business quotation. The method for quoting a business solution for a customer, comprises the steps of:

receiving customer requirements;

determining price units to be invoiced to customer;

designing a business solution to map the customer requirements;

decomposing the business solution into cost elements;

creating rules to link the price units to the cost elements; and computing a quotation by applying the rules created to a business rollout scenario.

There is also provided a system as defined in the appended independent claim 11, and a program storage device as defined in the appended claim 12.

Further embodiments of the invention are provided in the appended dependent claims.

BRIEF DESCRIPTION OF THE DRAWINGS

The above and other items, features and advantages of the invention will be better understood by reading the following more particular description of the invention in conjunction with the accompanying drawings wherein.

DESCRIPTION OF THE INVENTION

Figure 1:
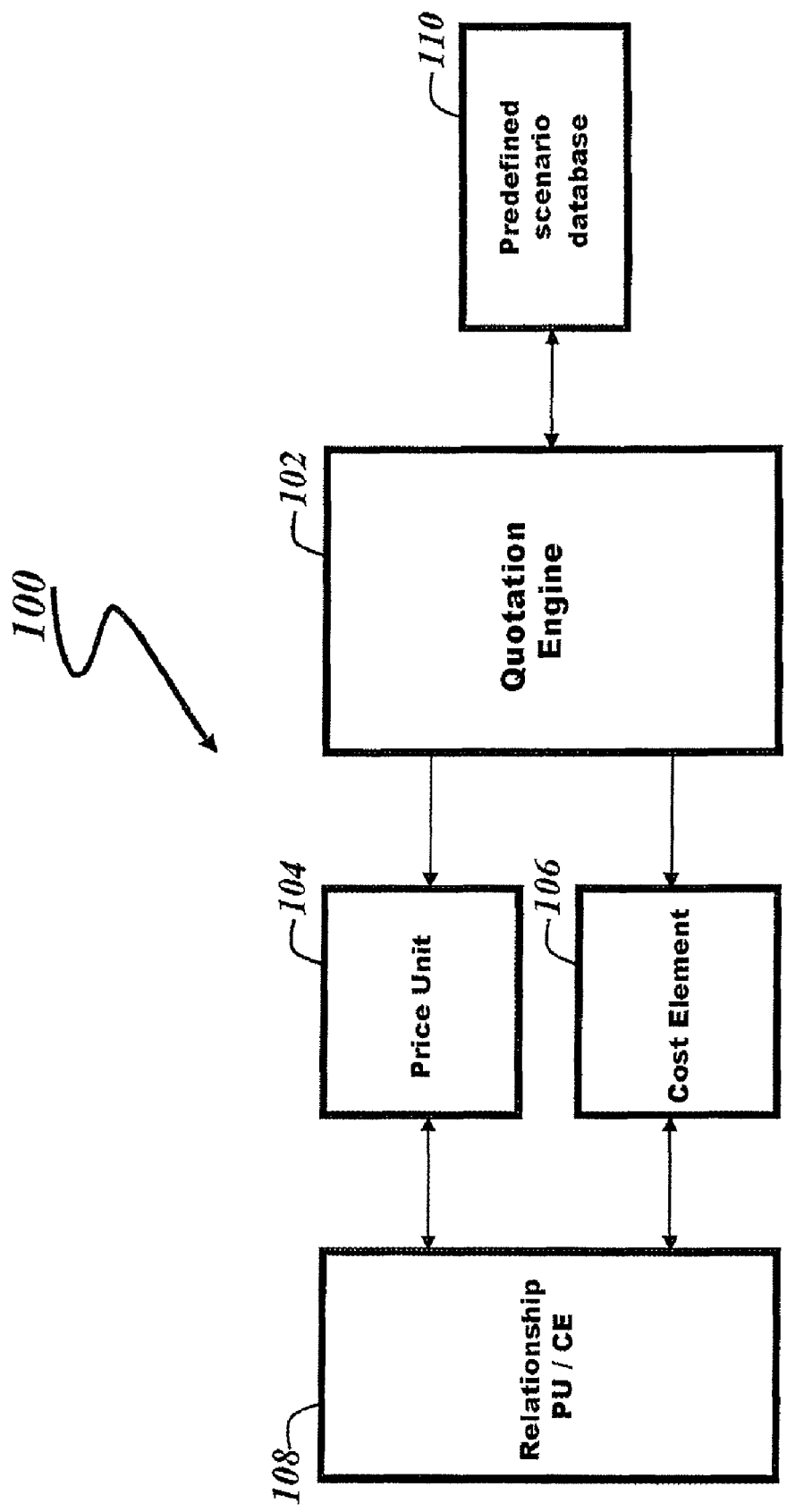
FIG. 1 shows a high-level block diagram of the logical elements to run the present invention.

Referring to FIG. 1, there is provided a system 100 to be used in various business contexts to compute a business service quotation for a business opportunity. The method operated on the system of the invention allows to manage a business profitability and its associated level of risk by monitoring, in real time, both Price Units 'PU' and Cost Elements 'CE'. A Price Unit block (104) and a Cost Element block (106) are coupled to a Quotation Engine block (102) wherein several iterations of a quotation may be exercised using different scenarios (sometimes herein called "scenari") selected from a predefined scenario database (110). The database contains predefined scenari and guidances to be used as adequate profiles corresponding to the business context. The database may be enriched by current and future scenari. The present invention is thus fully flexible and easily upgradeable to match with the most current and future business quotations in which interactive and dynamic assessments need to be applied to be compliant with the on-demand business strategy.

A relationship PU/CE block (108) is coupled to the Price Unit block and to the Cost Element block and contains the rules that link the Price Units to the Cost Elements. The rules define, including a threshold mechanism, the links between the Price Units deployment and the Cost Elements to be deployed to support the PU deployment.

Figure 2:
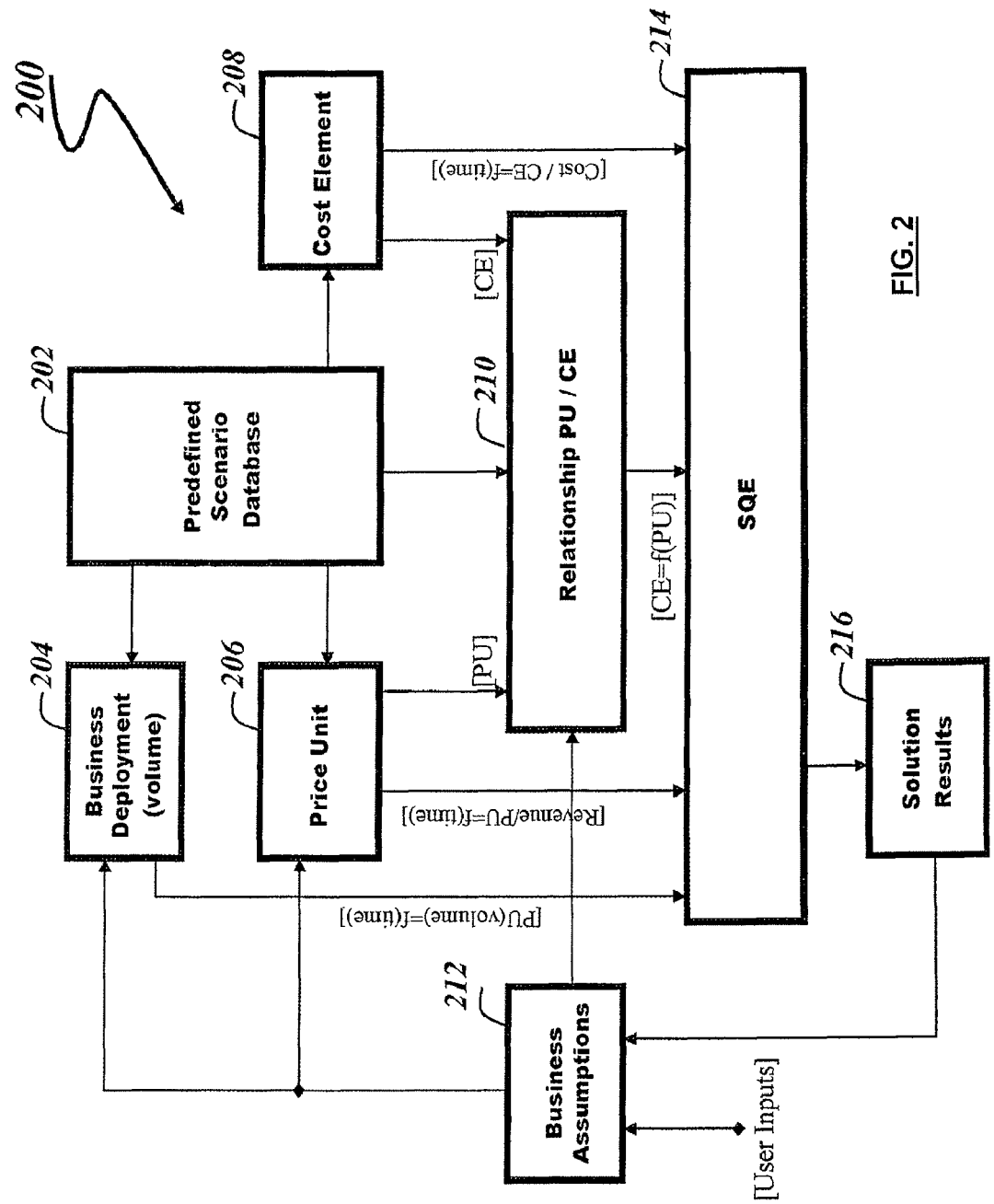
FIG. 2 represents in a symbolic form the logical simulation environment of the present invention.

FIG. 2 represents in a symbolic form the simulation environment (200) of the present invention. A simulation sequence (214) initiates a scalable business quotation in real time taking into account the business context, thereby improving the quality and reliability of the service delivery in order to meet the cost, the price and the schedule objectives.

The simulation environment firstly initializes a current business configuration and secondly optimizes the current business quotation by varying the configuration.

The simulation environment allows to select a Price Units [PU] (206) corresponding to a current identified Business Opportunity and to determine a volume of the Business Deployment associated with the selected Price Units, an allotted business cycle time [PU(volume)=Rtime)] associated to a revenue per Price Unit [Revenue/PU=f(time)]. Business Assumptions (212) either coming as first inputs from the customer or as iteration inputs (from block 216) reflect the business requirements. The simulation environment allows to check the effectiveness of the Cost Element [CE] (208) corresponding to the identified Business Solution via the selected predefined scenario (202). It also allows determination of the cost per CE in regard to the allotted business cycle time [Cost/CE=f(time)] and to the relationship (210) linking the Price Units to the Cost Elements [CE=f(PU)].

By changing the business assumptions, the simulation environment validates the completed interaction between the variable elements, detects and mitigates potential Price Unit and Cost Element integrity problems, and provides solution quotations (216) to various Price Unit iterations. The results are optimized by iteratively adjusting the Price Units and the associated Price Units volume (204) in a given time period until the business expectation are met. Final solution results are generated with all necessary information about the incremental business quotation, and may contain the information listed in the following equations:

$$PU(\text{volume})=f(\text{time})$$

$$CE(\text{volume})=f(\text{time})$$

$$\text{cost}=f(\text{time})$$

$$\text{revenue}=f(\text{time})$$

$$\text{profitability}=f(\text{time})$$

It is to be appreciated that the above listed information is a non-exhaustive one and that additional financial parameters may be delivered. The output results may be in the form of dashboard overviews, summaries, reports. The outputs may be provided on a computer display based on the operation performed by the simulation environment. It should be understood that the results may also be provided on any computer-readable medium.

Figure 3:
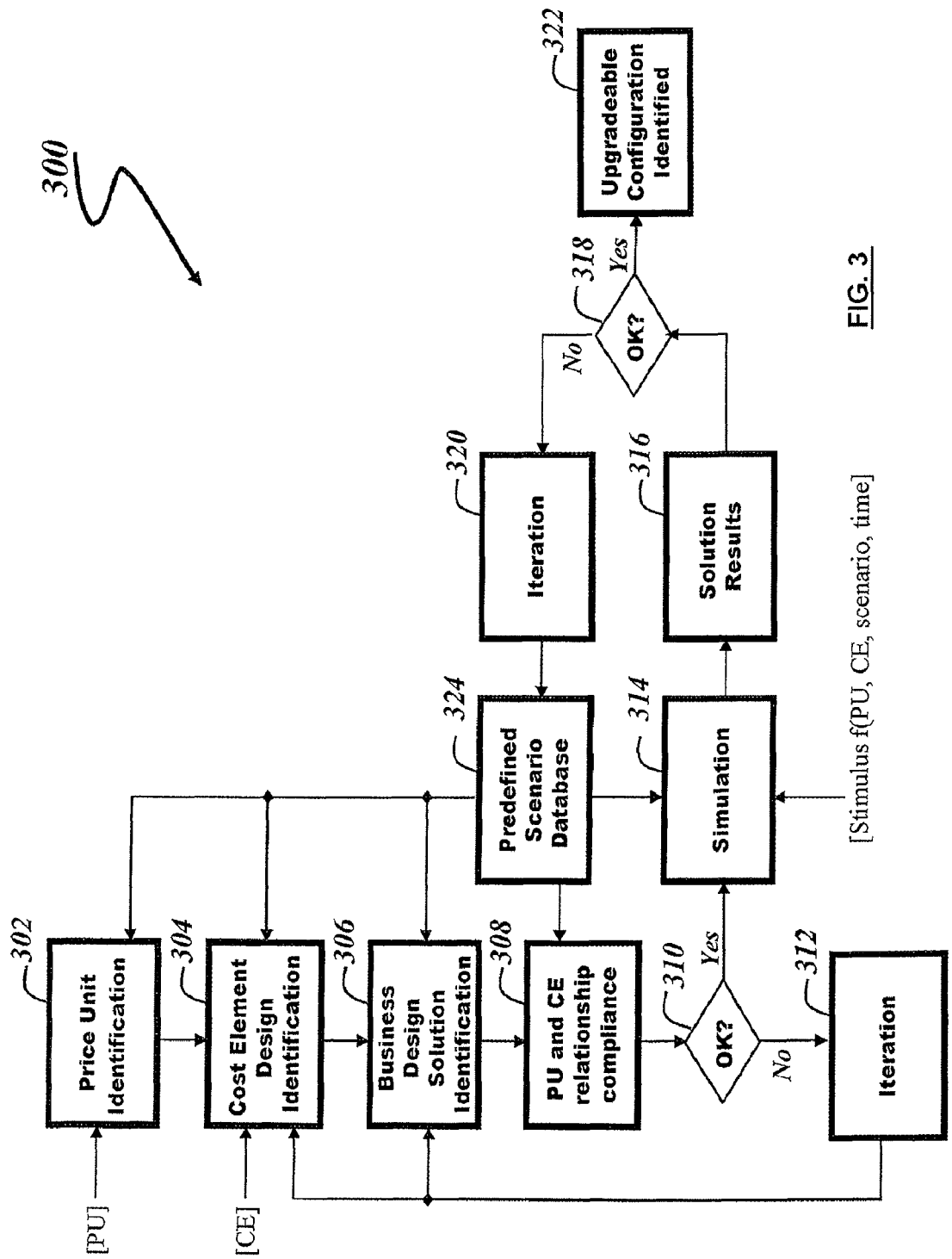
FIG. 3 is a high-level logical flowchart of the operation to generate a quotation according to the present invention.

Going now to FIG. 3, a high-level logical flowchart of the operation to generate a quotation according to the present invention is described.

Price Unit Identification (302):

The Price Unit [PU] is estimated by the solution provider as the elementary unit to be invoiced to the customer based on the customer's requirements. The Price Unit [PU] can be associated to a Marketable Price (MP) if requested. For example, Price Units may be Technical Units (such as disk space in GB or CPU hours), and/or Application Units (such as SAP user) and/or Business Units (such as managed insurance contracts). During the phase of the Price Unit Identification, the customer commitments are defined, the valuable Price Units [PU] related to the business opportunity are estimated and the business profitability is assessed to be sized in a cost effective way.

Table 1 below is an example of a price units list (on the right column) regarding several customer's requirements (on the left column):

| Customer's application requirements | Price Units |
|---|---|
| Storage capacity | Usable amount of disk capacity on high performance shark ESS bays (0 to x TB), price per GB |
| | Usable amount of disk capacity on high performance shark ESS bays (above x TB), price per GB |
| | Usable amount of disk capacity on medium performance shark ESS bays (0 to y TB), price per GB |
| | Usable amount of disk capacity on medium performance shark ESS bays (above y TB), price per GB |
| Backup volumes and retention policy | Used GB on tape (on-site and off-site) |
| Backup window size in hours | Backup throughput capability |
| Nber of servers to connect to the SAN for storage access or LAN-free backup | Used SAN ports |

Cost Element Design Identification (304):

The Cost Element depends on a plurality of properties like for example the assets and the liabilities issues, the business schedule that are essential parameters to characterize the target of the business profitability. The Cost Element [CE] represents the cost of a technical component. Depending on the business variations, the properties associated to the Cost Element [CE] are upgradeable to give the provider the flexibility to quickly readjust the business profitability with no impact added on the global process.

The Cost Element [CE] is part of the design flexibility belonging to the design solution that is identified in the Business Design Solution Identification phase (306).

The Cost Element [CE] is defined to fit with the following business requirements:
  a. limit initial investments;
  b. be able to install each upgrade in a cost effective way (cost elements not too small to limit installation costs nor too big to limit unused capacity);
  c. offer flexibility on all aspects (e.g. for a storage solution: SAN capacity, backup throughput, disk capacity of different level of performance, tape capacity, etc).

Table 2 below illustrates a Cost Element decomposition:

| Cost Element | Rollout granularity |
|---|---|
| McData 6140 switches | 2 (one switch per fabric) |
| 4 SAN port adapter (one adapter per fabric) | 2 (one adapter per fabric) |
| High performance shark ESS bay (with Turbo option and 36 GB disks, 15000 rpm) | 1 |
| Medium performance shark ESS bay (without Turbo option, with 72 GB disks, 15000 rpm) | 1 |
| 8 disk pack of each type (36 GB and 72 GB) associated with the additional workload to operate additional storage (LUN management, filesystem management, backup & restore management) | 2 |
| L32 and/or D32 tape library frames | 1 (to obtain more tape cells or tape drive emplacements) |
| LTO2 tape drive | 1 |
| 20 LTO2 tape pack | 1 |
| 12 LTO2 tape vaulting | 1 |
| TSM (Tivoli Storage Manager) server | 1 |
| Storwatch Expert Server | 1 |

Business Solution Design Identification (306):

Based on the business conditions and requirements that are identified from the Price Unit Identification phase and the Cost Element Design Identification phase, the adequate solution is evaluated in regard to the business context, the deadline objective, the customer requirement, the business volume and the business continuity. Various business combinations are available to focus on the business opportunity. The identification of the adequate business solution, like a reused solution, or a shared solution or a bespoke solution, in association with the deployment of the adequate elements [PU]+[CE] responding to the business expectation are key to support the design flexibility. In substance, the design flexibility allows to readjust quickly the business offering and to evaluate the costs corresponding to the Price Unit variations, in real time.

PU and CE Relationship Compliance (308):

The Price Unit [PU] and the Cost Element [CE] are linked together to establish a dynamic interaction when business assumptions vary. This allows to anticipate needs for volume assumption and capacity margins as well as the estimation of the configuration thresholds and the use of appropriate Cost Element [CE] to achieve the business solution. The relationship between the Price Unit [PU] and the Cost Element [CE] must fit with the business integrity as expected by the business solution. Once business integrity is established (illustrated by branch Yes of test block 310) all along the chain, the identified configuration is ready to be simulated. In the other case (branch No of test block 310), which means a non-conformity, the process is iterated (312) and the values of the initial parameters are readjusted.

Scenario (324) and Simulation (314):

The simulation environment follows a generic method that can be easily adapted to any number of uses and any business context.

The simulation algorithm (314) is based on a model using the Cost Element [CE] and Price Unit [PU] properties, their relationship and the design solution. The algorithm allows to readjust the business profitability over a range of conditions that are searched in the predefined scenario database or manually applied during the business assessment (not shown in the FIG. 3).

The simulation algorithm loads the model parameters corresponding to the Cost Element [CE] and the Price Unit [PU] and may input adequate stimulus to measure the level of risk and the profitability when business process changes. The stimulus defined by equation $$[\text{Stimulus}=f([PU],[CE],[\text{scenario}],[\text{time}])]$$

are listed here after:

definition of the Price Units [PU] to be invoiced to the client in terms of name, unit price and so on . . .

description of the Cost Elements [CE] of the design in terms of costs, HW, SW, Workload and so on . . .

description of the relationship between the [PU] deployment and the [CE] to be deployed to support the [PU] deployment when a configuration threshold is enabled; and selection of various scenari related to [PU] variations.

The simulation algorithm is adapted to manage business profitability by making an interlocked connection between the Cost Element (CE) and the Pricing Unit (PU). These two entities are parts of the business logic of offering a product and/or services and are easily re-adjusted to reflect the possible business commitment variations thereby allowing real-time changes of the initial business quoting with no impact of the business timing objectives.

The simulation algorithm automatically computes in a predefined time period, like quarter after quarter for example, the [CE] to deploy, the associated costs, the profitability of the scenario and all the information involved by a business quotation.

Solution Results (316):

The results of the simulation are delivered via a solution results interface to be observed by the user. Depending on both the business expectation and simulation assumptions the observed results can be accepted or not (318). The necessary information are provided to the user to initiate an incremental business quotation via an Iteration block (320) or to make the business quotation complete via an upgradeable configuration identified step (322).

Iteration (320):

Based on flexible features and the relationships between model parameters involved in the simulation algorithm, the disclosed method allows the business margin to be quickly re-evaluated by using some predefined scenario (324). The disclosed method manages the business profitability with the most flexible price unit [PU] possible in association with the most cost evaluation possible of the corresponding element [CE]. This method gains some insight into the mechanism that cause observed business behaviours and the fact to change some model parameters leads other results to be observed. Both the Price Unit [PU] and Cost Element [CE] parameter values are defined before the simulation is run. The iteration phase gives the user the possibility to update both the Price Unit and the Cost Element parameters as well as the design solution and the relationship between [PU] and [CE] that were preliminary defined by the selected scenario. The iteration phase investigates how different business variations are correlated and under what conditions the business model is re-adjusted. The user adjusts the threshold of the business configuration, anticipates the volume needed to satisfy the business objective and apprehends the business profitability.

For example, adjusting the Price Unit can lead to a negotiation of upgradeable commitments. Adjusting the Cost Element can lead to a negotiation of costs. Adjusting Cost Element splitting can lead to anticipation of the capacity. Adjusting the threshold of the configuration can lead to anticipation of the volume.

The simulation is re-initiated by using the updated scenario along and corresponding guidance and the new results are delivered to the user.

Upgradeable Configuration Identified (322):

The final business quotation is driven by executing the adequate scenario that specifies the business context and the interaction between the Price Unit [PU] and the Cost Element [CE]. Multiple scenarios and guidance can be taken into consideration (worst case, most probable and best case). For each of them, the method dynamically manages all the requirements related to the business profitability by respecting the solution design, the price unit variation, the cost element parameters, the business context and the guidelines. Additional instructions can be directly applied during the business quotation assessment via the Stimulus input [Stimulus]. Once the business quotation process is initiated the user easily updates the prices, quotes and invoices all along the process and has the possibility to add new scenarios. The business quotation is managed in regard to the business profitability on selected scenario and the expected results are automatically exhibited in real time for user consideration. The present quotation method enables a robust integrity between the Cost Element [CE], the Price Unit [PU] and the identified design solution. The elements related to the simulation are identified to be compliant with the assumptions and the business expectation and are stored as reference for future upgradeable iterations to satisfy future business quotation scalability requirements.

Figure 4:
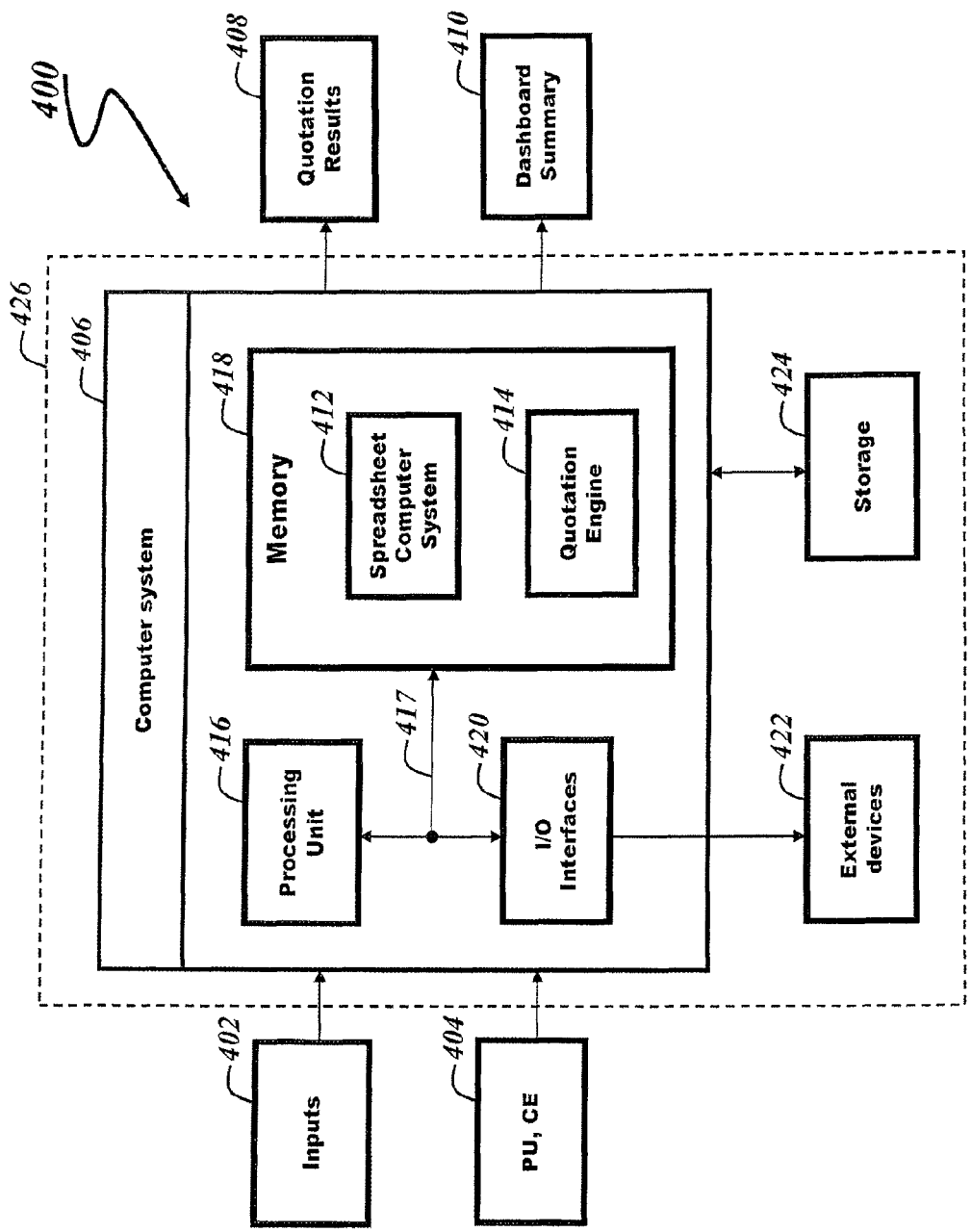
FIG. 4 shows an exemplary computer system for operating the method of the present invention.

Referring now to FIG. 4, a system 400 for identifying and quoting a business service according to the present invention is shown. As depicted, system 400 includes a computer system 406 deployed within a computer infrastructure 426. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 426 is intended to demonstrate that some or all of the components of system 400 could be deployed, managed, serviced, etc. by a service provider who offers to quote business service. The term 'services' used herein all along the description is also to be interpreted as a generic term covering solutions that may comprise hardware components and/or software components as well as and/or immaterial services such as education or so.

As shown, computer system 406 includes a processing unit 416, a memory 418, a bus 417, and input/output (I/O) interfaces 420. Further, computer system 406 is shown in communication with external I/O devices/resources 422 and storage system 424. In general, processing unit 416 executes computer program code, such as spreadsheet computer program and quotation algorithm, which are stored in memory 418 and/or storage system 424. While executing computer program code, processing unit 416 can read and/or write data to/from memory 418, storage system 424, and/or I/O interfaces 420. Bus 417 provides a communication link between each of the components in computer system 406. External devices 422 can comprise any devices (e.g., keyboard, pointing device, display, etc.) that enable a user to interact with computer system 406 and/or any devices (e.g., network card, modem, etc.) that enable computer system 406 to communicate with one or more other computing devices.

Computer infrastructure 426 is only illustrative of various types of computer infrastructures for implementing the invention. For example, in one embodiment, computer infrastructure 426 comprises two or more computing devices (e.g., a server cluster) that communicate over a network to perform the various process steps of the invention. Moreover, computer system 406 is only representative of various possible computer systems that can include numerous combinations of hardware. To this extent, in other embodiments, computer system 406 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 416 may comprise a single processing unit, or be distributed across one or more processing units in one or more locations, e.g., on a client and server. Similarly, memory 418 and/or storage system 424 can comprise any combination of various types of data storage and/or transmission media that reside at one or more physical locations. Further, I/O interfaces 420 can comprise any system for exchanging information with one or more external devices 422.

Still further, it is understood that one or more additional components (e.g., system software, math co-processing unit, etc.) not shown in FIG. 4 can be included in computer system 406. However, if computer system 406 comprises a handheld device or the like, it is understood that one or more external devices 422 (e.g., a display) and/or storage system(s) 424 could be contained within computer system 406, not externally as shown.

Storage system 424 can be any type of system (e.g., a database) capable of providing storage for information under the present invention, such a customer requirements, customer commitments, scenario and guidances, business quotations, customer changes, etc. To this extent, storage system 424 could include one or more storage devices, such as a magnetic disk drive or an optical disk drive. In another embodiment, storage system 424 includes data distributed across, for example, a local area network (LAN), wide area network (WAN) or a storage area network (SAN) (not shown). Although not shown, additional components, such as cache memory, communication systems, system software, etc., may be incorporated into computer system 406.

Shown in memory 418 of computer system 406 is quotation system 414, which is implemented in conjunction with spreadsheet computer program 412 (e.g., LOTUS 1-2-3, MICROSOFT EXCEL, etc.).

These systems will provide the functionality of the present invention. It should be understood, that although shown as separate programs, spreadsheet computer program 412 and quotation system 414 could be implemented as a single program within the meaning of the phrase "in conjunction with". As will be further described below, quotation system 414 can receive inputs such as (but not limited to) initial user assumptions 402, and Price Units, Cost Elements, and PU/CE relationship 404. Such inputs are processed and output as iterated quotation results 408 and a final dashboard summary 410 may be provided as the agreed final quotation.

The invention claimed is:

1. A computer implemented method for quoting a business solution for a customer, performed on a computer, the method comprising the steps of:

receiving customer requirements;

determining a plurality of types of price units to be invoiced to customer, with each type of price unit being an elementary unit used to measure the billing to the customer;

designing a business solution to map the customer requirements;

decomposing the business solution into a plurality of types of cost elements, where each type of cost element represents the cost of a technical component;

creating rules to link the price units to the cost elements so that values for the cost elements are determined as a function of values for the price units; and generating, by the computer, a quotation by applying the rules created to at least one business rollout scenario;

wherein the generating step is performed iteratively to generate iterative price quotations, with at least one of the price units, the cost units and the rules being iteratively modified before each iteration of the generating step, and with the relationships between the price units and cost units being interlocked so that an iterative adjustment of any one of the price units, the cost units and the rules will cause corresponding adjustments, based on the interlocked relationships between the price units and cost units, to values of any affected price units and values of any affected cost units in order to generate the iterative price quotation; and wherein the receiving, determining, designing, decomposing, creating steps are performed on a computer.

2. The method of claim 1 wherein the step of determining price units further comprises the steps of associating a marketable price to the price unit.

3. The method of claim 1 wherein the price units is a price applicable to units from a group of technical units, application units or business units.

4. The method of claim 1 wherein the cost elements are individual or multiple technical components of the business solution.

5. The method of claim 1 wherein the rules creation step comprises the step of defining rules between a price units deployment and a cost element to be deployed to support said price units deployment.

6. The method of claim 1 wherein the generating step further comprises the step of selecting a business rollout scenario among a plurality of predefined scenarios.

7. The method of claim 1 wherein the generating step is run for a predefined rollout time period.

8. The method of claim 1, wherein the computer-implemented method is implemented in conjunction with a spreadsheet computer program.

9. The method of claim 1, further comprising the step of generating a dashboard summary showing the computing step results.

10. A computer system for quoting a business solution for a customer, the system comprising:

means for receiving customer requirements;

means for determining a plurality of types of price units to be invoiced to customer, with each type of price unit being an elementary unit used to measure the billing to the customer;

means for designing a business solution to map the customer requirements;

means for decomposing the business solution into a plurality of types of cost elements, where each type of cost element represents the cost of a technical component;

means for creating rules to link the price units to the cost elements so that values for the cost elements are determined as a function of values for the price units; and mean for computing a quotation automatically by the computer system by applying the rules created to at least one business rollout scenario;

wherein the means for computing further comprises means for iteratively generating iterative price quotations, with at least one of the price units, the cost units and the rules being iteratively modified before each iteration of the generating step, and with the relationships between the price units and cost units being interlocked so that an iterative adjustment of any one of the price units, the cost units and the rules will cause corresponding adjustments, based on the interlocked relationships between the price units and cost units, any affected values of the price units and any affected values of the cost units in order to generate the iterative price quotation.

11. The computer system of claim 10, wherein the means for determining price units further comprises means for associating a marketable price to the price unit.

12. The computer system of claim 10, wherein the price units is a price applicable to units from a group of technical units, application units or business units.

13. The computer system of claim 10, wherein the cost elements is individual or multiple technical components of the business solution.

14. The computer system of claim 10, wherein the means for creating rules comprises the means defining rules between a price units deployment and a cost element to be deployed to support said price units deployment.

15. A computer program product comprising programming code stored on a computer readable medium for quoting a business solution for a customer, performed on a computer, comprising:

means for receiving customer requirements;

means for determining a plurality of types of price units to be invoiced to customer, with each type of price unit being an elementary unit used to measure the billing to the customer;

means for designing a business solution to map the customer requirements;

means for decomposing the business solution into a plurality of types of cost elements, where each type of cost element represents the cost of a technical component;

means for creating rules to link the price units to the cost elements so that values for the cost elements are determined as a function of values for price units; and means for computing a quotation automatically by the computer by applying the rules created to at least one business rollout scenario;

wherein the means for computing comprises means for iteratively generating iterative price quotations, with at least one of the price units, the cost units and the rules being iteratively modified before each iteration of the generating step, and with the relationships between the price units and cost units being interlocked so that an iterative adjustment of any one of the price units, the cost units and the rules will cause corresponding adjustments, based on the interlocked relationships between the price units and cost units, any affected values of the price units and any affected values of the cost units in order to generate the iterative price quotation.

16. The computer program product of claim 15, wherein the means for determining price units further comprises means for associating a marketable price to the price unit.

17. The computer program product of claim 15, wherein the means for creating rules comprises the means defining rules between a price units deployment and a cost element to be deployed to support said price units deployment.

18. The computer program product of claim 15, wherein the means for computing further comprises means for selecting a business rollout scenario among a plurality of predefined scenarios.

* * * * *